US008151326B2

(12) United States Patent
Brown

(10) Patent No.: US 8,151,326 B2
(45) Date of Patent: Apr. 3, 2012

(54) USING AUDIO IN N-FACTOR AUTHENTICATION

(75) Inventor: Gerry A. Brown, Cupertino, CA (US)

(73) Assignee: Core Mobility, Inc., Mountain View, CA (US)

( * ) Notice: Subject to any disclaimer, the term of this patent is extended or adjusted under 35 U.S.C. 154(b) by 1516 days.

(21) Appl. No.: 11/608,633

(22) Filed: Dec. 8, 2006

(65) Prior Publication Data

US 2008/0141353 A1 Jun. 12, 2008

(51) Int. Cl.
*H04L 29/06* (2006.01)
(52) U.S. Cl. .......................................... 726/5; 713/169
(58) Field of Classification Search ........................ None
See application file for complete search history.

(56) References Cited

U.S. PATENT DOCUMENTS

| | | | |
|---|---|---|---|
| 2005/0268107 A1* | 12/2005 | Harris et al. | 713/182 |
| 2007/0186095 A1* | 8/2007 | Ganesan et al. | 713/155 |
| 2008/0034428 A1* | 2/2008 | Bejar et al. | 726/23 |

OTHER PUBLICATIONS

Bank of America; https://sitekey.bankofamerica.com/sas/signonScreen.do?; Website accessed Jun. 2006.
Sean Michael Kerner; VeriSign's VIP Protects Sign-On IDs; http://www.internetnews.com/bus-news/print.php/3584666; Feb. 13, 2006; pp. 1-3.
VERISIGN; http://www.verisign.com/products-services/security-services/identity-protection/index.html; Website accessed Jun. 2006.
VERISIGN: http://www.verisign.com/verisign-inc/news-and-events/news-archive/us-news-2006/page_037022.html; Feb. 13, 2006 Press Release.

* cited by examiner

*Primary Examiner* — Gilberto Barron, Jr.
*Assistant Examiner* — Virginia T Ho
(74) *Attorney, Agent, or Firm* — Workman Nydegger

(57) ABSTRACT

A multi-factor authentication solution implements a recognizable voice in conjunction with a user address to increase login security and reduce user inconvenience. A user creates an online account, providing an address such as a telephone number or email address to which voice messages may be sent. The user selects a recognizable voice such as the user's own voice or the voice of a famous or well-known figure. When the user attempts to login to the online account, a random passphrase is generated and converted to a voice message employing the user's pre-selected voice and the voice message is sent to the user's address. The user listens to the voice message and if the user recognizes the voice rendering the passphrase the user's login request is granted.

26 Claims, 6 Drawing Sheets

USING AUDIO IN N-FACTOR AUTHENTICATION

CROSS-REFERENCE TO RELATED APPLICATIONS

Not applicable.

BACKGROUND OF THE INVENTION

1. The Field of the Invention

The present invention relates generally to identity verification. More particularly, embodiments of the invention relate to systems and methods for using multiple factors including voice recognition to authenticate login parameters generated by a server.

2. The Relevant Technology

According to a 2005 Federal Trade Commission report, 37 percent of all Internet Fraud complaints filed dealt with identity theft. A Gartner research report "Credit Report and Internet Data Theft Results in More Fraud in 2005" found that of those surveyed, financial losses resulting from information stolen off the Internet was $2.7 Billion.

One way Internet fraud can occur is by email spoofing or forging. For example, Bob receives an email that appears to be from his credit card company, when actually it is sent from another source (the "spoofer"). In this instance, the email includes a link that appears to be the credit card company website. The link may in fact point to a site that looks like the credit card company's site but which is, in fact, created by the spoofer to trick Bob into releasing sensitive information. Once the spoofer obtains Bob's sensitive information (e.g., credit card number, pin number, social security number), the spoofer may use Bob's sensitive information for fraudulent purposes. For example, the spoofer may use Bob's credit card information to make purchases and so on.

Unfortunately, many websites are susceptible to spoofing attacks because they employ single-factor authentication, commonly referred to as weak authentication, to establish a user's identity and privileges. Single-factor authentication requires only one independent factor to establish a user's identity and privileges, which factor is often in the form of a password. Passwords can be categorized as something the user knows while other factors that may be used to authenticate a user include something the user has or something the user is. Examples of what a user has include a USB dongle or token, a credit card, a debit card, a smart card, an RFID device, or other physical items. Examples of what a user is include various biometrics, such as a fingerprint, a deoxyribo nucleic acid (DNA) profile, a retinal pattern and so on.

Two-factor authentication, also known as strong authentication, is used to enhance login security. Two-factor authentication requires two independent factors to establish a user's identity and privileges. A common example of two-factor authentication is when Bob withdraws money from an ATM using his debit card (something Bob has) and his personal identification number (something Bob knows). A malicious individual seeking to defraud Bob and his bank needs both the card and the password to withdraw Bob's money from Bob's bank.

While two-factor authentication offers increased security as compared to single-factor authentication, there is no need to limit an authentication process to two factors. Indeed, it may be desirable to use three or more factors in an authentication process. In general terms, however, any authentication process using at least two factors may be referred to as multi-factor authentication.

Multi-factor authentication, often employing something a user knows and one or more differing factors, has worked well with high security personnel and computer professionals but thus far it has not worked well with the public. One reason for the public's reluctance to adopt multi-factor authentication may be that users object to the inconvenience of keeping, carrying and/or locating the multiple physical items necessary to supply the something a user has or something a user knows factor.

For instance, many multi-factor authentication solutions require a password and provide individuals with a physical item (such as a USB dongle or token, a smart card, an RFID device), which provides a second factor for authentication. However, this solution is inconvenient to consumers who conduct business online with multiple companies, and impractical and expensive for companies operating businesses on the Internet, such as financial institutions, ISPs or e-commerce sites.

BRIEF SUMMARY OF THE INVENTION

Embodiments of the present invention are directed to systems and methods for multi-factor authentication over the Internet and other networks. In particular, embodiments of the invention enable the use of voice recognition as one factor in a multi-factor authentication process, and also enable the use of items commonly possessed by users as factors in a multi-factor authentication process. In this manner, users logging in to websites can be confident that the websites they log in to are legitimate websites and their inconvenience in using a multi-factor authentication solution is reduced. Moreover, the organizations or companies associated with the websites can be confident that the users logging in to their websites are authorized or registered users.

When a user initially accesses a website, the user may be required to register. The website implements multi-factor authentication that is set up during the registration process. One of the factors used in multi factor authentication is related to voice recognition. A recognized "voice" is chosen by the user to be later used by the website to send authenticated passwords to the user. The user may also provide a wireless telephone number, email address, or other address to which the server delivers the authenticated passwords as voice messages. The passwords or other information is delivered using the voice that the user selected in the registration process.

When the user desires to login to the user's account, the user goes to the company's website and types in the user's username. The server typically informs the user that a password will be sent to the user's address and that the user may login to the company's website as soon as the user types in the password. The server then generates the password, converts it to a voice message using the voice previously selected by the user and sends the voice message to the user's address. The user listens to the voice message and hears the password. Because the user recognizes the pre-selected voice, the user has confidence in the authenticity of the company's website and the security of the user's account information. In other words, the user's recognition of the voice authenticates the out of band password sent by the server. The user enters the password, the server accepts the password if it matches the password it generated and the user is able to access the user's account.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
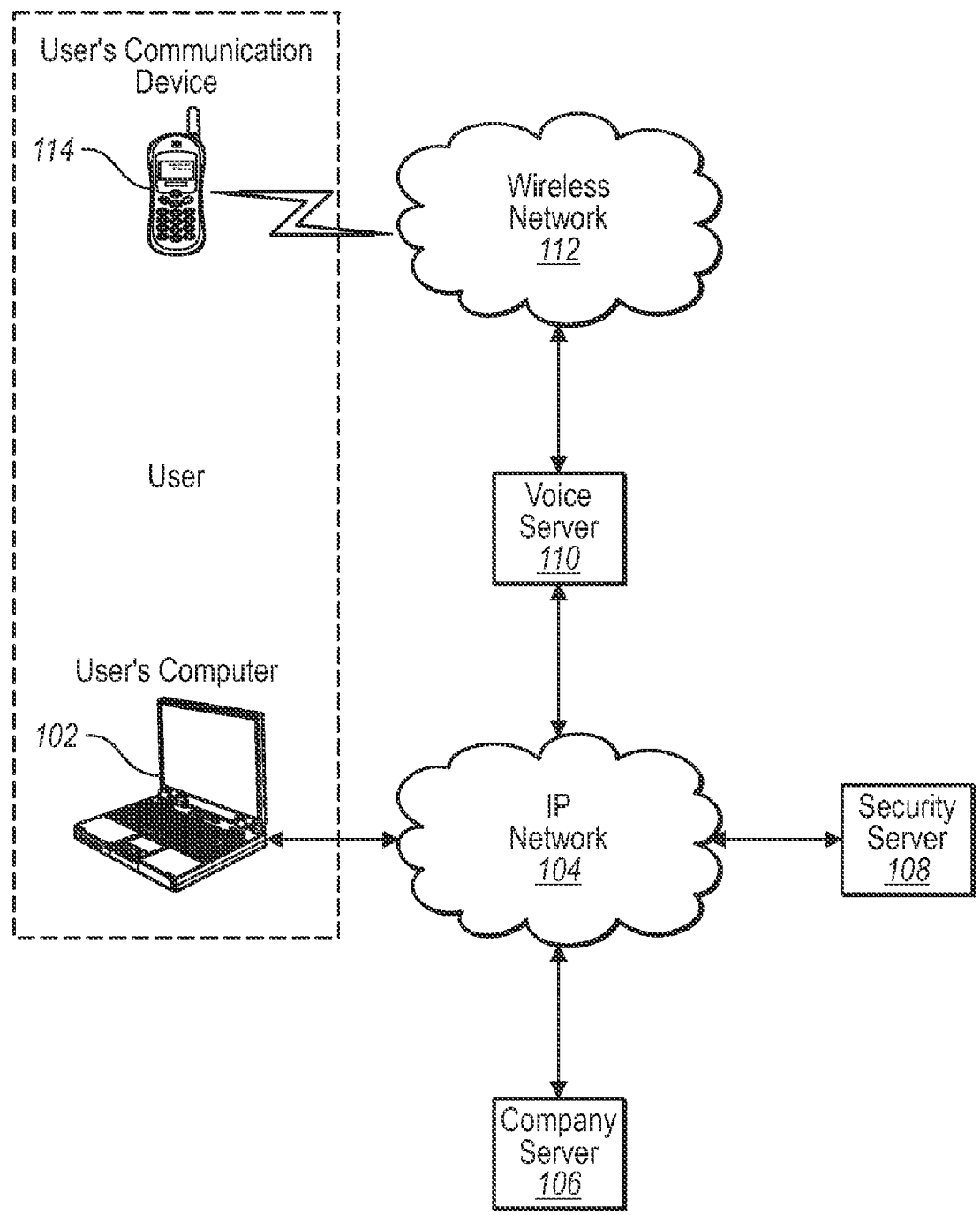
FIG. 1 illustrates an operating environment in which voice may be implemented as an authentication factor for multi-factor authentication.

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

In general, embodiments of the invention are concerned with multi-factor authentication methods and systems. More particularly, embodiments of the invention enable the use of audio as one factor in a multi-factor authentication process. Embodiments of the invention can apply to many situations where user authentication is required, such as is required when users access information or content over a network such as the Internet.

A user of a company's website registers or sets up an account to gain access to certain content such as personal data, account data and other data through the company's website. Often, this data is personal or sensitive information. In a typical embodiment, for example, the restricted content may include the user's name, social security number, date of birth, driver's license number, bank account numbers, credit card account numbers, other account numbers and the like or any combination thereof The company may be a financial institution such as a bank with which the user has a bank account, an information provider (such as a legal database, etc.) that grants content access to registered users, and in general, any company, entity, institution or organization having a desire to prevent unregistered users from gaining access to restricted content on a network. Thus, the content may be personal in nature, but can also be other types of content (such as content available by subscription or purchase).

During registration or account setup, the user may create a username and provide an address such as an email address, telephone number, pager number or other address to which messages, such as voice messages or voice message alerts, may be sent. For instance, voice messages may be sent as attachments to email messages or a link to a voice message may be sent in an email. Voice messages may be sent directly to a communication device when the address is a wireless telephone number or they may be sent to a voice message server which may cause a telephone or pager to display a voice message alert. In one embodiment, "address" therefore includes, but is not limited to, any voice message address associated with a user which the user can access to listen to voice messages.

The user selects a voice which is used to render passphrases required to access the restricted content on the company's website. The user may select a voice from among a list of famous, well-known or otherwise recognizable voices, such as the voices of celebrities, public figures, politicians and impersonators thereof. Alternately, the user may select a new voice, in which case the new voice is recorded. The new voice may be the user's voice, or the voice of someone known personally by the user. When the user selects a new voice, the new voice recites one or more alphanumeric characters into a microphone and the recitation is recorded. The alphanumeric characters may comprise the letters of an alphabet, such as the letters A through Z and the numbers of a numbering system, such as the numbers zero through nine.

After the user has registered with the website, the website can then provide multi-factor authentication that includes, in one example, voice authentication as one of the factors.

The user returns to the company's website to access the restricted content and inputs the previously created username. The website informs the user that the user will receive a voice message—rendered in the voice previously selected by the user (the "pre-selected voice")—of a password or passphrase. The passphrase comprises one or more alphanumeric characters and typically may only be used for one login session; in other words, the passphrase is typically a One Time Passphrase or OTP. Alternatively, the password can be valid for some period of time or for a certain number of access attempts, and the like.

The voice message is sent to the user's address and the user listens to the voice message to learn the passphrase. If the voice used to render the passphrase is the pre-selected voice, the user recognizes it and inputs the passphrase as instructed by the website. By inputting the correct passphrase, the user is permitted to login or otherwise access some or all of the restricted content. As indicated previously, the content accessed is often dependent on the nature of the website being accessed.

One of the objects of the invention, therefore, is the authentication of the passphrase and the website by the user. If the user is attempting to login to a legitimate website, the user receives a voice message passphrase after entering a username. If the user recognizes the voice as the pre-selected voice, the user authenticates the legitimacy of the passphrase (and consequently of the website and server) since only the server for the legitimate website knows the voice pre-selected by the user. If the user unwittingly attempts to login to an illegitimate website, the user may receive a passphrase rendered in some other voice or, alternatively, none at all. In this case, the passphrase is not authenticated since the voice is not the pre-selected voice, and the user knows not to provide any personal information to the website.

FIG. 1 illustrates an exemplary implementation of an operating environment, denoted generally at 100. The operating environment 100 includes a computing device 102 configured to send and receive data over a network 104. Generally, the network 104 comprises a packet switching network such as an Internet Protocol (IP) network and may also include or represent 802.xx networks, Bluetooth access points, wireless access points, and the like and any combination thereof The computing devices 102 that may be employed in conjunction with the invention include laptop or desktop computers, PDAs, smartphones, cellular telephones and any other device capable of sending and receiving data and suitably equipped to establish communication with a server on a network.

A user of the computing device 102 accesses a company's website with the computing device 102 to set up an online account. The user may have a pre-existing relationship with the company and is merely setting up an online account, such as when a bank customer registers for online banking in association with a pre-existing bank account, or the user may be initiating a new relationship with the company, such as when a user sets up an account for the first time with an electronic securities trading company, and so on. In a typical embodiment, the company website is supported by a company server 106, which may also provide database support and application development platforms, etc. for the company website. Alternately, the company website may be hosted by a web hosting service.

The user provides the necessary information to create an online account and may be prompted or may request to enroll in an authentication service offered by the company. The authentication service offered by the company enables multifactor authentication when a user logs in to the user's online account. In one embodiment, the user may have the option to enroll in the service, while in another embodiment enrollment in the service may be mandatory and may simply be a part of account registration. At times, the company server 106 may handle authentication enrollment requests. Alternately, the company server may transmit enrollment requests to the security server 108, which may be done via the IP network 104, a dedicated link or in some other manner.

In the present embodiment, the security server 108 collects the necessary information to enroll the user in the authentication service. For instance, the security server may require the user to provide a voice message address. The information required by the security server 108 may have already been input by the user when creating the online account with the company server 106 and may be forwarded to the security server 108, and/or the security server may prompt the user to input the necessary information. The user may request or be prompted to select a voice factor as one factor to be used for authentication when the user is logging on to the user's online account. If the user selects the voice factor, the request is forwarded to the voice server 110.

The voice server 110 prompts the user to select a specific voice which will be used to render passphrases sent to the user. In one embodiment, the user selects a new voice and the new voice is recorded. In order to record the new voice, the user's computer 102 is equipped with the necessary hardware for recording sound (such as a microphone). For instance, when the user chooses to record a voice such as the user's own voice, the voice server 110 may prompt the user to recite aloud a set of alphanumeric characters. After the user selects a voice and the company server 106, security server 108 and voice server 110 collect the necessary information, setup of the user's online account with voice authentication is complete. Alternatively, the user may select from a set of existing voices, which typically includes voices that the user can recognize.

Some time after setting up an online account with the company, the user accesses the company's website to login to the user's online account. Typically, the user inputs the username associated with the online account into the website after which the company server 106 informs the user that a passphrase will be sent to the voice message address provided by the user during registration. The company server 106 forwards the login request to the security server 108 which may implement a random or pseudo-random passphrase generator to generate the passphrase, the passphrase typically comprising one or more alphanumeric characters. The passphrase is then forwarded to the voice server 110.

The voice server 110 converts the passphrase into a voice message where the voice used is the user's pre-selected voice. Hence, if the user selected the voice of a celebrity or celebrity impersonator, the passphrase is converted into the celebrity/impersonator's voice. If the user selected the user's own voice, the passphrase is converted into the user's voice. The voice server 110 may convert the passphrase into an MP3 format voice message, AMR format voice message, MMS format voice message or any other suitable format. The specific format may be chosen according to the voice message address provided by the user. For instance, an MP3 format message may be sent to an email address, while an AMR or MMS format message may be sent to a wireless telephone number.

In one embodiment, the voice server 110 converts the passphrase into an instant voice message or MMS voice message and transmits the voice message via a wireless network 112 to a user's communication device 114. The user's communication device may comprise a cellular telephone, PDA, smartphone, pager or any other device capable of establishing communication with the network 112 and receiving voice messages or voice message alerts. The wireless network 112 may include or represent a cellular RF network as well as other types of wired/wireless networks such as, but not limited to, 802.xx networks, Bluetooth access points, wireless access points, IP-based networks, a Public Switched Telephone Network and broadcast networks such as FM radio or satellite radio.

In another embodiment, the voice server 110 converts the passphrase into an MP3 voice message. The voice server may attach the MP3 file to an email message or email a link to where the voice message is stored on the voice server or elsewhere. When the voice message is sent using email (either as an attached file or as a link), the user may retrieve the email message with the user's computer 102, or with a user's communication device 114 configured to receive emails. In another embodiment, the voice server 110 transmits the voice message to an Interactive Voice Response (IVR) server and sends the user an SMS message with instructions to call into the IVR server to retrieve the message. In yet another embodiment, the voice server 110 transmits the voice message to a voice message server of the user and the voice message server may send an alert to the user's communication device 114 of a waiting voice message. In another embodiment, an instant voice message can be sent to the device 14 without calling the device 114.

The user listens to the voice message, whether sent to an email address, directly to the user's communication device 114 as an instant or MMS voice message or in some other way and receives the passphrase. If the user recognizes the voice in which the passphrase is rendered, the user must input the passphrase into the appropriate data field of the company's website in order to login or gain access to restricted content.

Advantageously, the system 100 enables multi-factor authentication using audio as one of the factors. When a user logs in to an online account and is required to input a passphrase sent as a voice message to the user, there are at least three authentication factors, one of which is based on what the user has and two of which are based on what the user knows:

First, the user may have a device to which the passphrase voice message is sent. At a minimum, the user has a voice message address to which the passphrase voice message is sent. In the exemplary embodiment, the user has a mobile phone to receive passphrase voice messages while in another embodiment the user may have an email account to receive passphrase voice messages. Second, the user must know the passphrase to login to the user's online account, the passphrase being sent to the user in the voice message. Finally, the user must know (and recognize) the voice which renders the passphrase. Based on the first two factors, the company server 106 can authenticate the identity of the person attempting to login to the company's restricted content. Based on the third factor, namely, the user's recognition of the voice, the user can authenticate that the user is logging in to the proper website, and not a fraudulent look-alike site.

Figure 2:
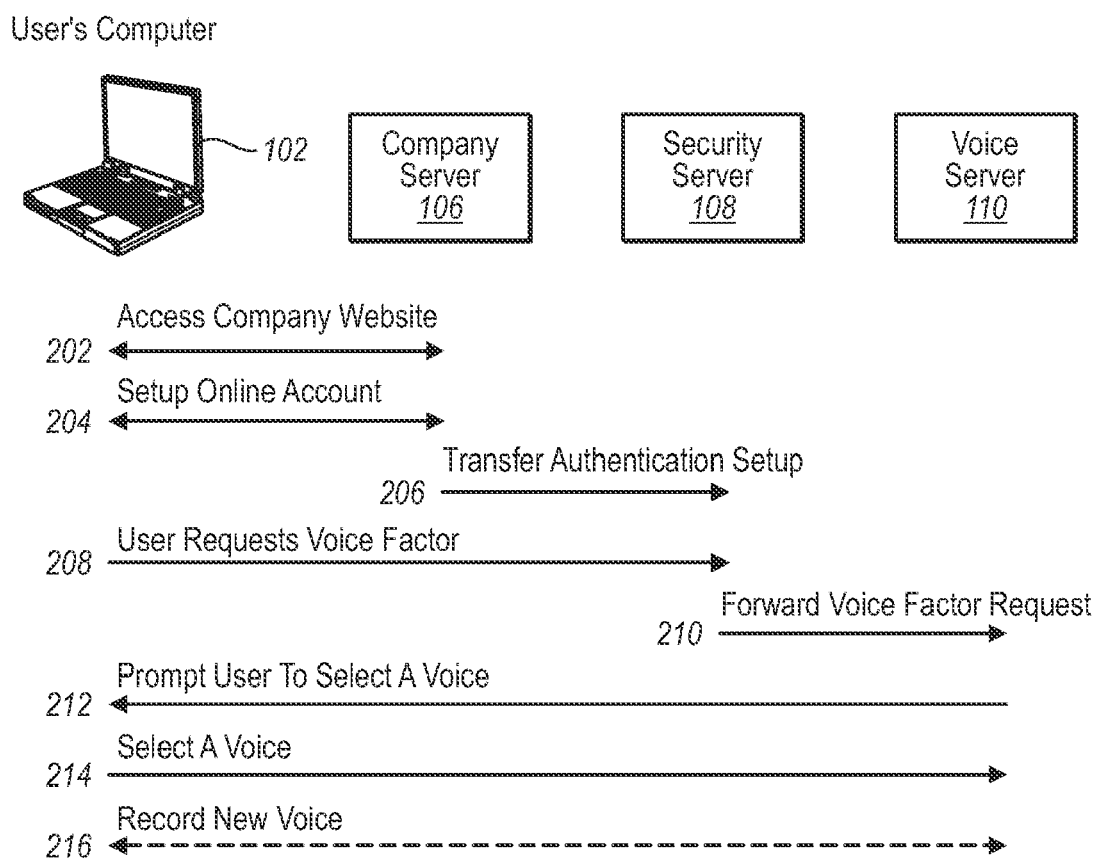
FIG. 2 depicts communication flows for registering a user to receive voice message passphrases.

With regard now to FIG. 2, details are provided concerning one embodiment of a process for setting up an online account which implements voice in a multi-factor authentication process. A user accesses 202 the company's website with the user's computer 102 over the IP network 104. While accessing 202 the website, the user's computer and the company server communicate using the HTTP protocol, for example. Further, the HTTP protocol or any other appropriate protocol may be used for communication between the user's computer 102 and the servers 106, 108, 110 and between the servers themselves. The servers 106, 108, and 110 can be implemented on a single server or can be implemented on multiple servers. Also, the provider of each server 106, 108, and 110 can be the same or different.

A user registers or sets up 204 an online account so that the user may gain access to restricted content. The company server performs the initial account setup and transfers 206 authentication setup to the security server 108. The user requests 208 or is prompted to select a voice factor as an authentication factor, and the voice factor request is forwarded 210 from the security server 108 to the voice server 110. The voice server prompts 212 the user to select a voice from among a plurality of available voices or to select a new voice provided by the user. The user selects 214 a voice and the user's selection is stored by the voice server. Unless the user selects a new voice provided by the user, setup of the user's online account is complete. The voice server 110, security server 108 or company server 106 may display a web page or otherwise acknowledge completion of the registration process to the user. However, if the user selects a new voice provided by the user, the voice server and the user may record 216 the new voice before completing registration.

Figure 3:
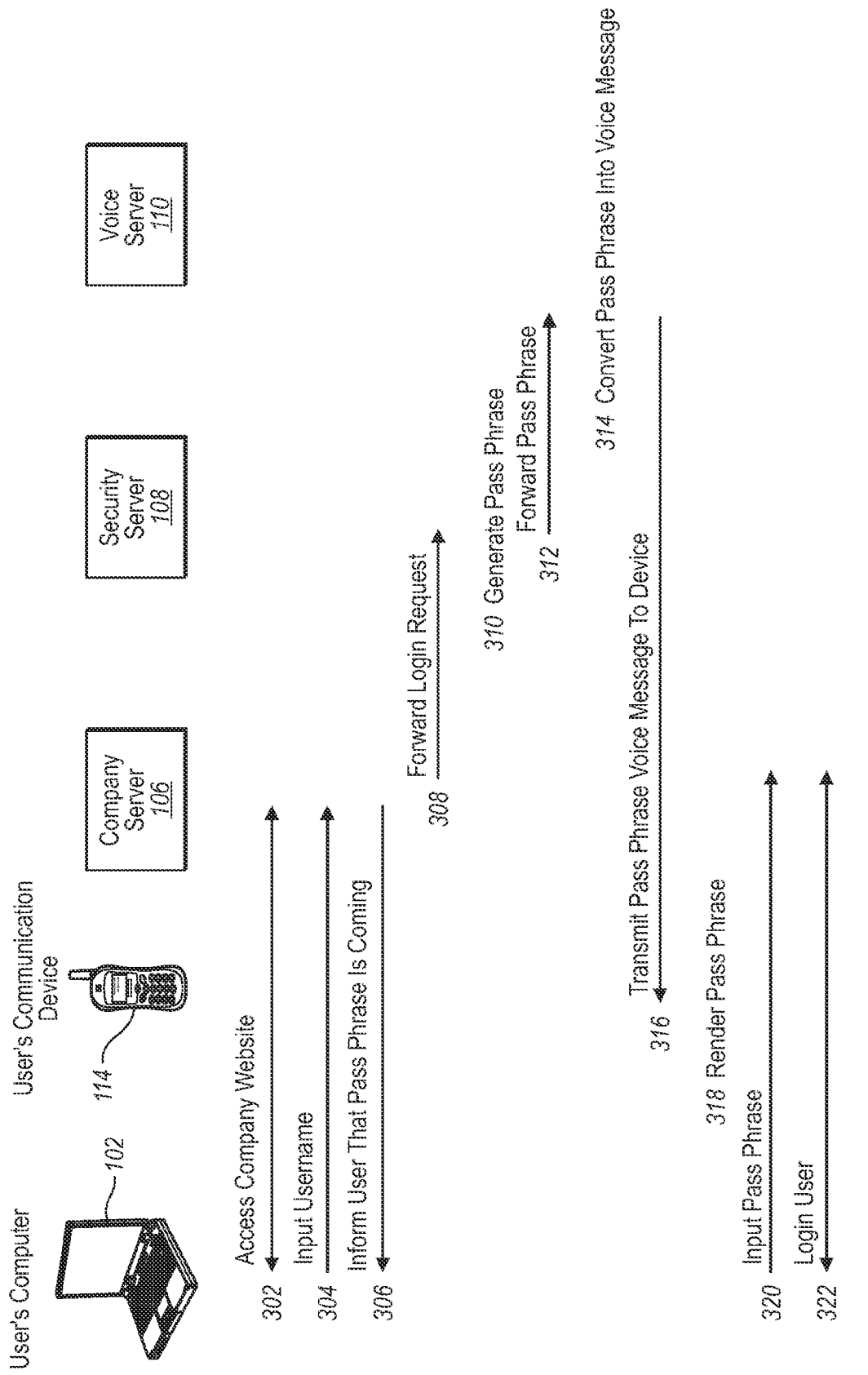
FIG. 3 depicts communication flows for multi-factor authentication with a user-recognized voice.

With reference to FIG. 3, one embodiment of a process for implementing voice as a factor in a multi-factor authentication process is shown. After setting up an online account, a user accesses 302 a company website supported by a company server 106 and inputs 304 a username to login to the user's online account. The company server informs 306 the user that a passphrase voice message will be sent to the user, instructs the user to input the passphrase after the user receives it if the voice that renders the passphrase is the user's pre-selected voice and forwards 308 the user's login request to the security server. The security server 108 generates 310 a passphrase and forwards 312 the passphrase to the voice server. The voice server converts 314 the passphrase into an appropriately formatted voice message and transmits 316 the passphrase to the user's communication device 114. Alternately, the voice message may be transmitted to an email address or other address as described above.

The user retrieves the passphrase voice message and listens to it as it is rendered 318 by the user's communication device 114, the user's computer 102 or by some other device. Typically, the user receives the passphrase voice message within moments of inputting the username into the company's website. If the voice of the passphrase voice message is the user's pre-selected voice, the user inputs 320 the passphrase into the company's website, enabling the user to login 322 to the user's online account and gain access to restricted content.

Figure 4:
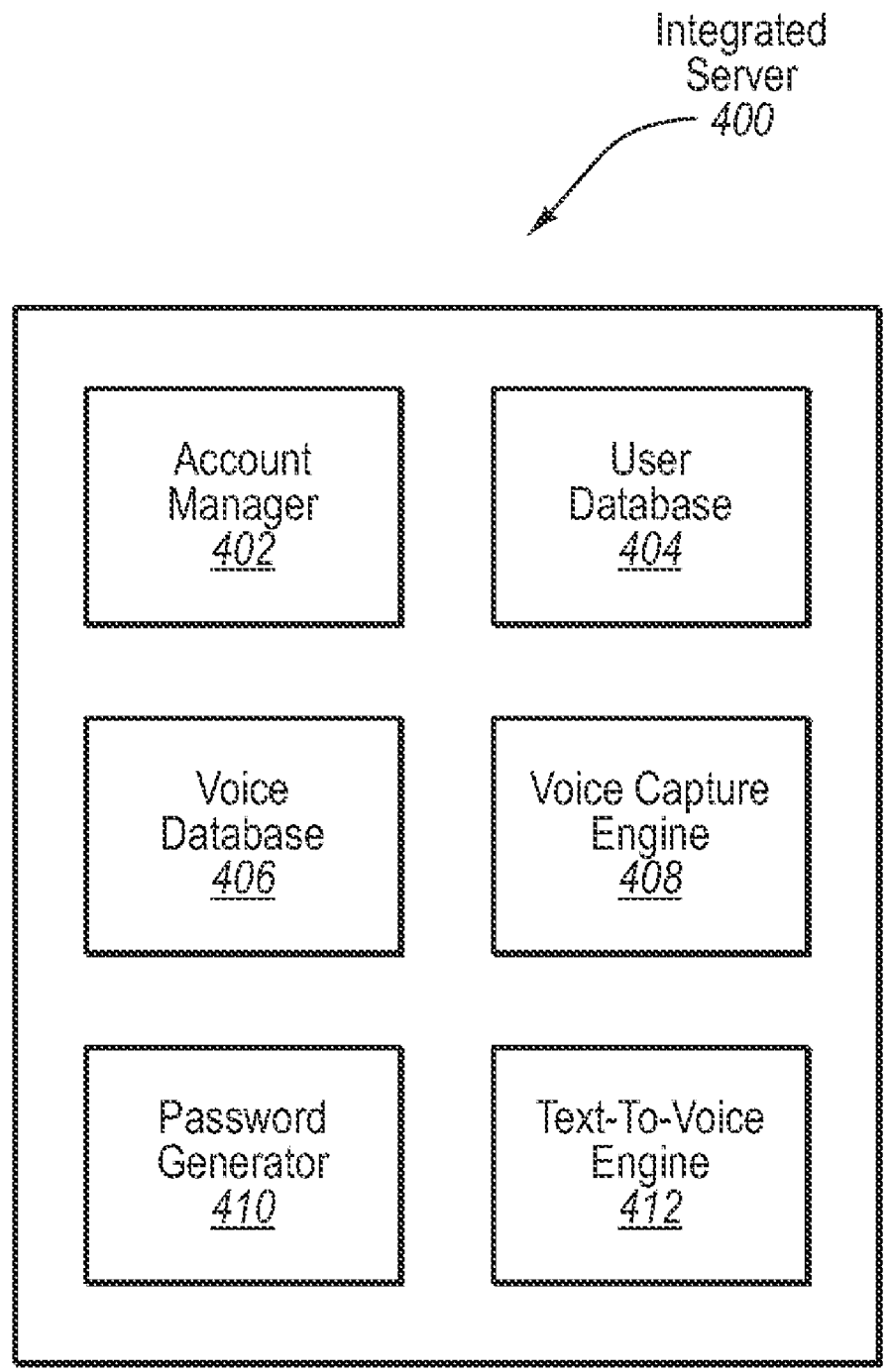
FIG. 4 illustrates exemplary hardware and software modules utilized to implement voice in a multi-factor authentication process.

While the embodiments of FIGS. 1, 2 and 3 depict three different servers, e.g., a company server 106, security server 108 and voice server 110, all three servers are not necessary to implement embodiments of the invention. The various hardware and software programs and modules used to implement the functions and designs of the present invention may be distributed to multiple servers as shown, or can be integrated into one server. For instance, FIG. 4 illustrates an exemplary embodiment of an integrated server capable of implementing the functions and designs of the present invention.

A server 400 provides database support, application development platforms, etc. for a company's websites and restricts access to some or all of the websites. A user registers or sets up an online account to gain access to the restricted content through the server 400. The user may establish a connection with the network 104 using the user's computer 102 and communicate with the server 400 using HTTP or another suitable protocol. The account manager 402 guides the user through the registration or setup process and may prompt the user for the information necessary to complete registration. For instance, the user may be prompted to create a username and provide a voice message address. The account manager 402 creates a user profile with the user's username, address and other information and stores it in the user database 404.

In the present embodiment, the account manager 402 prompts the user to select a voice for the rendition of passphrases. The voice may be selected from among a plurality of voices stored in the voice database 406, or the user may select to record a new voice. In either case, the account manager records the voice selection in the user's profile in the user database. If the user chooses to record a new voice, a voice-capture engine 408 guides the user through the process of recording the voice. For instance, the user may be instructed to recite aloud alphanumeric characters as they are displayed by the user's computer and the user's character recitations are recorded and stored in the voice database 206. The registration process is complete when the user has input the requested information and selected a voice.

The voice selected by the user is used for authentication when the user returns to the company website to login to the restricted content. Thus, voice recognition is employed in this example from the user's perspective. The user inputs the username and the account manager 402 informs the user that a passphrase will be sent to the user's address. A password generator 410 generates a unique passphrase which is typically used for only one login session. The password generator 410 may comprise a software program or hardware device that takes input from a random or pseudorandom number generator to automatically generate passphrases. A text-to-voice engine 412 refers to the user's profile in the user database 404 to determine the user's pre-selected voice as well as the type of address provided by the user and subsequently converts the passphrase into an appropriately formatted voice message. The voice message is transmitted to the user's address and the user listens to it. If the user recognizes the voice as the pre-selected voice, the user has confidence that the user is logging into a legitimate website. Additionally, the company has confidence that the user is a registered user because the user knows the password and could not have received the password without having the address recorded in the user's profile.

Figure 5:
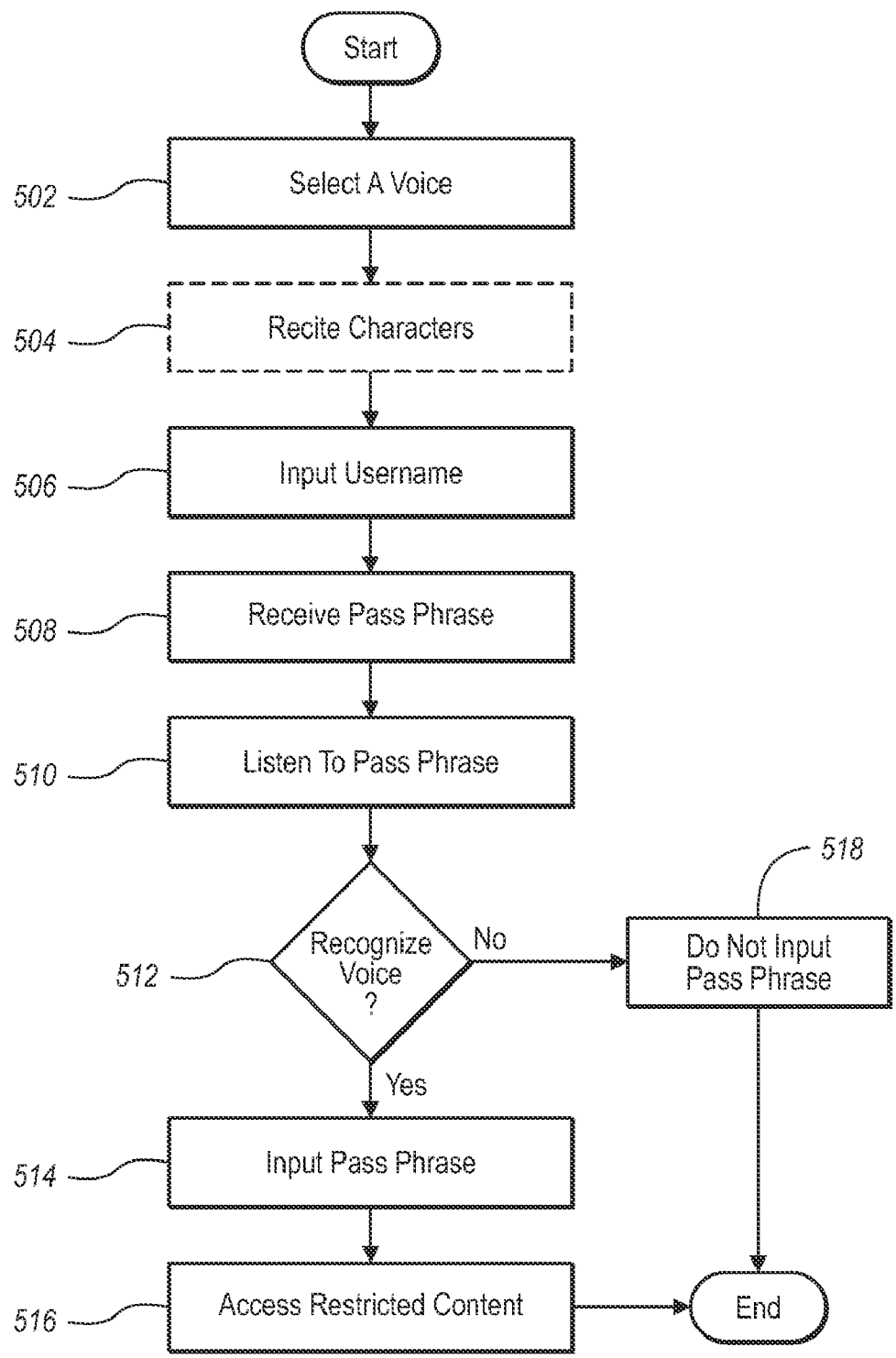
FIG. 5 is a flowchart depicting a process for authenticating a website with a user-recognized voice.

Turning attention now to FIG. 5, a flow chart illustrating a process for authenticating a website using a recognizable voice is illustrated. A user registers for access to a restricted content website and selects 502 a voice. If the user optionally selects a new voice, the user provides a voice (typically the user's own voice) and the user may new recite 504 a set of alphanumeric characters. The user completes registration and returns to the restricted content website to gain access. The user inputs 506 a username and is instructed to input a passphrase. The user receives 508 the passphrase sent to a voice message address of the user and listens 510 to the passphrase. If the user recognizes 512 the voice rendering the passphrase as the pre-selected voice, the user inputs 514 the passphrase and gains access 516 to the restricted content. If the user does not recognize 512 the voice rendering the passphrase or does not receive a passphrase voice message, the user does not input 518 a passphrase.

Figure 6:
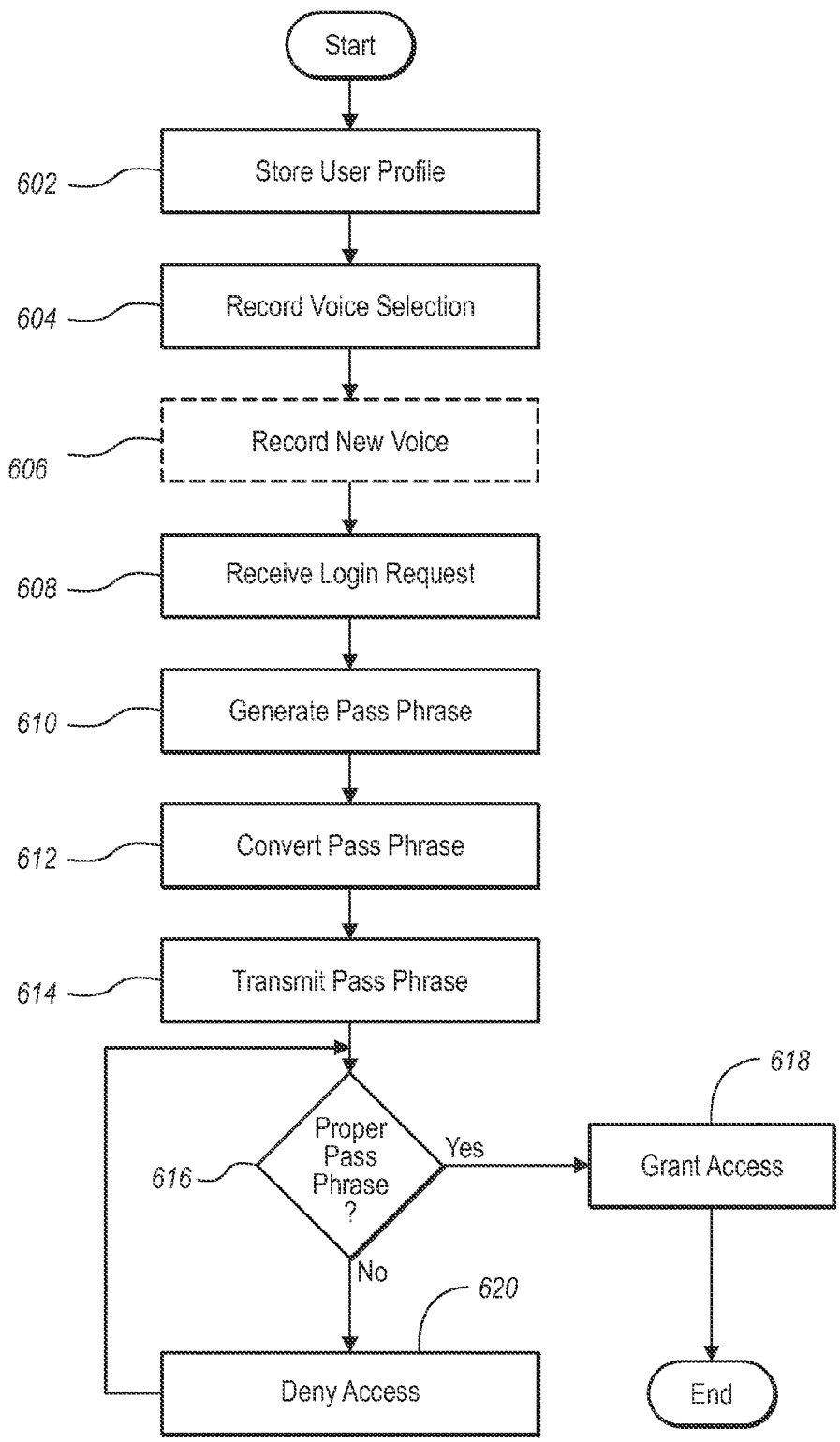
FIG. 6 depicts a process for using voice to authenticate a user attempting to login to a restricted content website.

A flow chart illustrating a process for using voice to authenticate a user is illustrated in FIG. 6. A user registers to access a restricted content website and a server supporting the website stores 602 a user profile for the user, often including a username and a voice message address. The server may prompt the user to select a voice and the server records or stores 604 the voice selection. If the user optionally selects a new voice, the server prompts the user to recite a set of alphanumeric characters and the server records 606 the new voice reciting the characters as previously described.

The server completes registering the user and later receives 608 a login request for the username associated with the user. The server generates 610 a passphrase and converts 612 the passphrase into an appropriately formatted voice message using the user's pre-selected voice. The passphrase is transmitted 614 to the voice message associated with the user. If the login request is submitted by the actual user, the user is expecting the voice message, listens to it and inputs the passphrase to login. If the input passphrase is the same as the one generated by the server 616, the server grants 618 the user access to restricted content. If the input passphrase is not correct 616, the server denies 618 the user access to the restricted content.

Advantageously, the present invention allows the server to authenticate the user with multi-factor authentication. And it allows the user to authenticate the server using voice recognition. This minimizes phishing attacks. Further, this can be done without inconveniencing the user with physical items dedicated to authentication. The user is unable to login unless the user knows a passphrase and the user cannot obtain the passphrase unless the user has a device (or address) to which the passphrase is sent. In the case where the passphrase is sent to the user's device, a spoofer or other malicious entity has to monitor an IP network to obtain the user's username as well as a wireless communication network to obtain the passphrase. Even if the spoofer succeeds in obtaining the passphrase, the passphrase is typically an OTP and is only valid one time so if the user has already used it to access the company website or network resource, it is useless to the spoofer.

Additionally, the present invention enables a user to authenticate a website and thereby avoid fraudulent websites. For instance, a spoofer may send an email message to an email address of the user in order to obtain the user's confidential information, such as account information. The email message purportedly comes from a company with whom the user has an online account and includes a link to a purportedly legitimate, though fraudulent website for the company. The user may click on the link and enter the user's username and password, thereby permitting the spoofer to obtain the user's username and password for the company's legitimate website. The spoofer can use this information to perpetrate financial fraud and identity theft. The present invention helps prevent this type of fraud. When a user goes to a company's website, whether fraudulent or legitimate, the user only enters a username because the user does not know what the password is in advance. If it is a legitimate company website, the user receives a voice message rendered in the user's preselected voice reciting a one time passphrase and the user feels secure that the website it is accessing is a legitimate company website. Otherwise the user may be suspicious of the website and not provide it with any personal information.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of authenticating an access request for restricted content, the method comprising:
   receiving a login request from a user over a network;
   generating a passphrase for the user;
   converting the passphrase to a voice message such that the voice message contains the passphrase and the voice message is rendered using a voice that was previously selected by the user;
   transmitting the voice message to a voice message address associated with the user, the voice message including the passphrase rendered using the voice previously selected by the user;
   receiving an input passphrase from the user over the network, provided the user recognizes the transmitted passphrase is rendered in the voice previously selected by the user;
   determining whether the input passphrase received from the user matches the generated passphrase which was rendered using the voice previously selected by the user and transmitted in the voice message to the voice message address; and
   granting the login request when the input passphrase received from the user matches the generated passphrase.

2. The method of claim 1, further comprising storing a user profile associated with the user, the user profile comprising a username and the voice message address.

3. The method of claim 2, further comprising storing the user's selection of the voice in the user profile.

4. The method of claim 1, wherein the previously selected voice comprises one or more of the user's voice, a voice of somebody known personally by the user, a famous voice, or a recognizable voice.

5. The method of claim 1, further comprising recording the voice.

6. The method of claim 1, wherein granting the login request further comprises granting access to restricted content.

7. The method of claim 6, wherein the restricted content comprises one or more of a user's name, social security number, date of birth, driver license number, credit card account number, bank account number, or account information.

8. The method of claim 1, further comprising denying the login request if the input passphrase does not match the generated passphrase.

9. The method of claim 1, wherein the voice message address comprises one or more of an email address, a telephone number and a pager number.

10. The method of claim 1, wherein the passphrase is a single use passphrase.

11. A method for using audio in multi-factor authentication, the method comprising:
- receiving input from a user selecting a voice, wherein the voice is used during subsequent login requests by the user for bi-directional authentication;
- sending a username provided by the user to a website for entry in a login request;
- receiving a voice message at a device, the voice message generated in response to the username and including a passphrase which has been rendered in the voice selected by the user;
- rendering the voice message to the user such that the user can determine the passphrase and ascertain that the voice of the voice message is the same as the voice previously selected by the user; and
- receiving the passphrase from the user, provided the user recognizes the transmitted passphrase is rendered in the voice previously selected by the user, wherein the passphrase is used to authenticate the user in the login request to gain access to restricted content on the website.

12. The method of claim 11, wherein the voice comprises one or more of the user's voice, the voice of somebody known personally by the user, a famous voice, or a recognizable voice.

13. The method of claim 12, further comprising the user or somebody known personally by the user reciting aloud a set of alphanumeric characters to record the voice.

14. The method of claim 11, wherein receiving a voice message at a device comprises one or more of:
- receiving a voice message directly on a communication device, the voice message comprising the passphrase which has been rendered in the voice selected by the user;
- receiving an email message including an attachment comprising the voice message;
- receiving an email message comprising a link to the voice message;
- receiving a short message service message comprising instructions to call an interactive voice response server to retrieve the voice message; and
- receiving a page comprising instructions to call a telephone number to retrieve the voice message.

15. The method of claim 11, wherein rendering the voice message to the user comprises one or more of:
- using a mobile phone, personal digital assistant, or smartphone connected to a cellular communication network to access the voice message; and
- using a mobile phone, personal digital assistant, smartphone, laptop computer or personal computer connected to a packet-switched data network to access the voice message.

16. The method of claim 11, wherein the passphrase comprises one or more alphanumeric characters.

17. The method of claim 11, wherein the restricted content comprises one or more of a user's name, social security number, date of birth, driver license number, credit card account number and bank account number.

18. The method of claim 11, wherein the passphrase is a single use passphrase.

19. A system for authenticating a user requesting access to electronic data, the system comprising:
- a user database for storing information about a plurality of users, the information including registration information;
- a voice database from which the users select a voice that is used in a multi-factor, bi-directional, authentication process;
- a password generator for generating random or pseudo random passphrases in response to a login request received from a user; and
- a text-to-voice engine for converting passphrases into passphrase voice messages that are transmitted to the user, wherein the passphrase voice messages comprise the passphrases rendered in the voice selected by the user, and wherein a login initiated by the login request is completed by receiving the passphrase which was rendered in the voice selected by the user, previously transmitted to the user in the rendered voice and received by the user, provided the user recognizes that the transmitted passphrase was rendered in the voice previously selected by the user.

20. The system of claim 19, further comprising a server communicably connected to one or more communication devices and one or more computing devices, wherein a user accesses electronic data over one of said computing devices and receives the passphrase voice messages over one of said communication devices.

21. The system of claim 19, further comprising at least one of a wireless communication network and a packet switched data network.

22. The system of claim 19, wherein the passphrases comprise one or more alphanumeric characters.

23. The system of claim 19, further comprising restricted content to which one or more users desire access.

24. The system of claim 23, wherein the restricted content comprises one or more of a user's name, social security number, driver's license number, credit card account number and bank account number.

25. The system of claim 19, wherein the registration information about a plurality of users comprises a username associated with each user, a voice message address associated with each user and identification of a voice selected by each user.

26. The system of claim 19, further comprising a voice capture engine for recording new voices when the voice selected by a user is to be recorded.

* * * * *